UNITED STATES PATENT OFFICE.

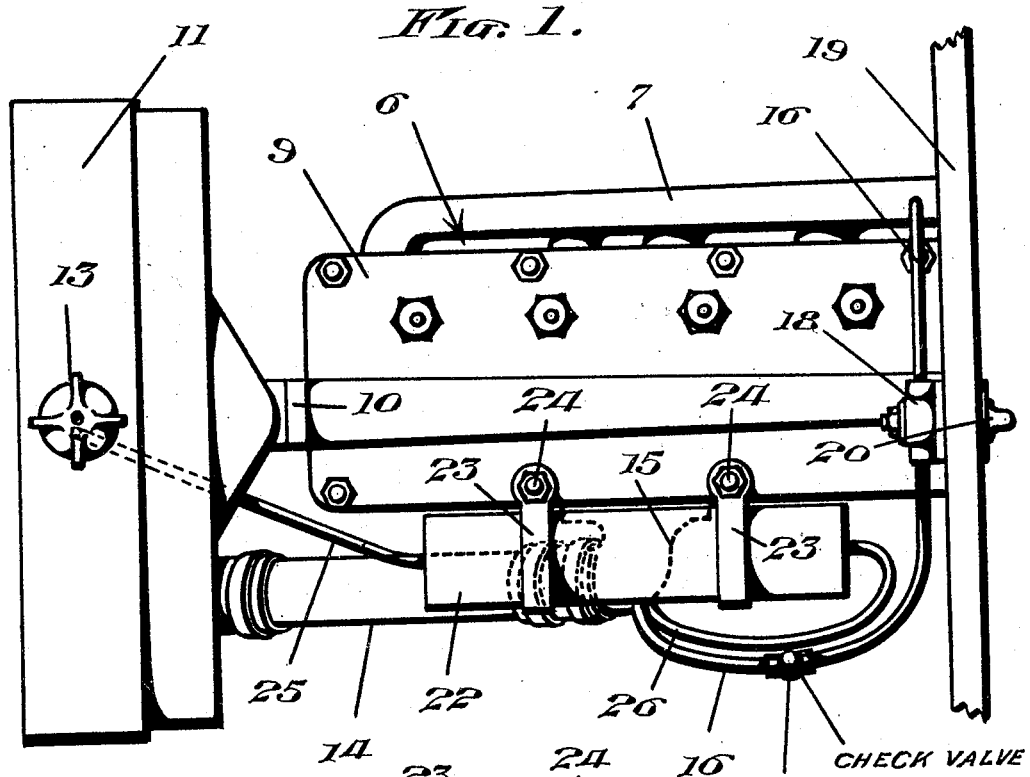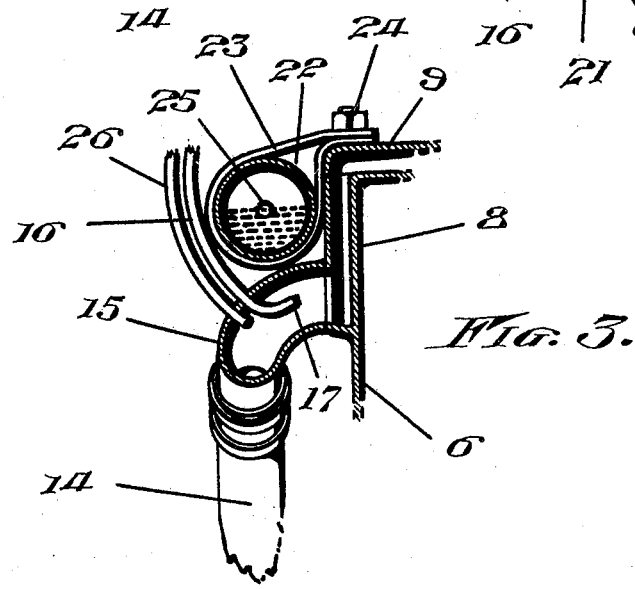

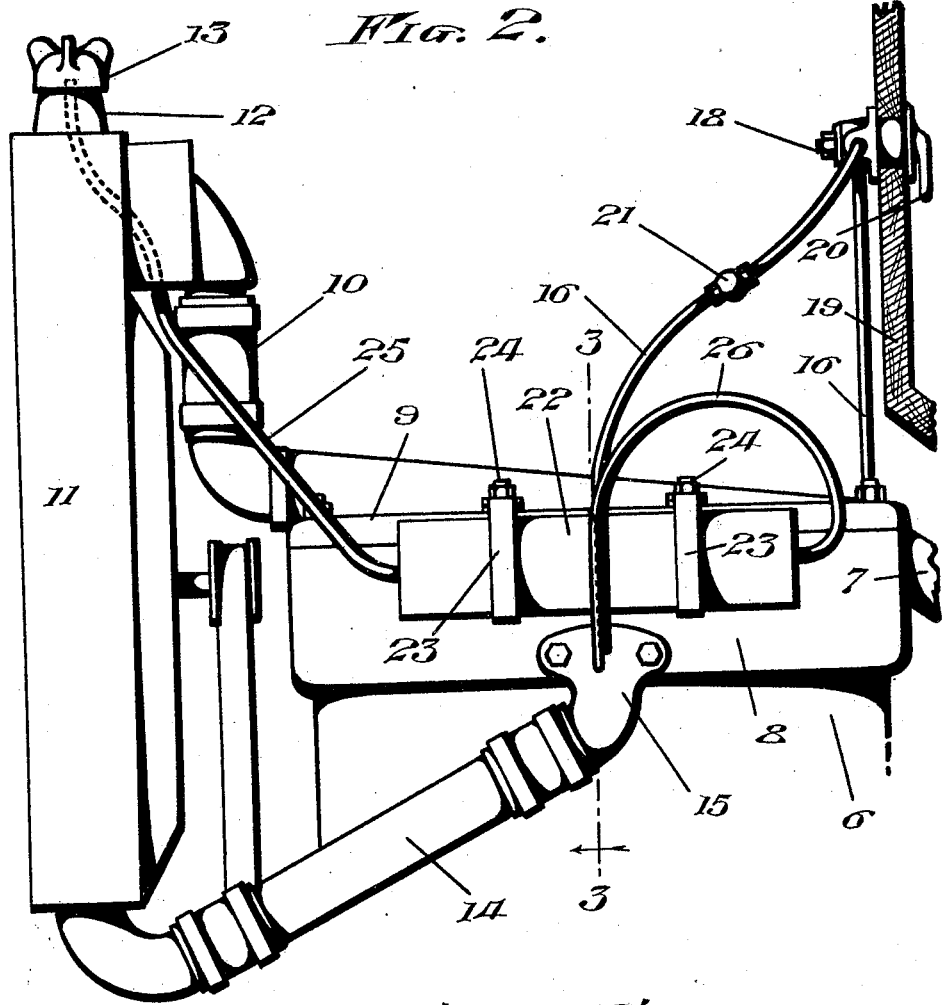

RAY TAYLOR, OF WESTON, WEST VIRGINIA, ASSIGNOR OF ONE-HALF TO GEORGE I. KEENER, OF WESTON, WEST VIRGINIA.

WATER-CIRCULATING SYSTEM.

1,412,981.   Specification of Letters Patent.   Patented Apr. 18, 1922.

Application filed February 16, 1921. Serial No. 445,479.

*To all whom it may concern:*

Be it known that I, RAY TAYLOR, a citizen of the United States, residing at Weston, in the county of Lewis and State of West Virginia, have invented certain new and useful Improvements in Water-Circulating Systems, of which the following is a specification, reference being had therein to the accompanying drawing.

The present invention relates to the water circulating system of an internal combustion engine, and aims to provide a novel and improved device for attachment to an automobile engine, especially an engine of a Ford automobile or the like, in order to keep the system filled with water.

A further object is the provision of novel means for receiving the vapor, steam and overflow water from the upper portion of the radiator, at the highest point of the water circulating system, in order to catch such water, vapor and steam, and to condense the steam, for the return of the water to the circulating system.

A still further object is the combination of such means whereby they cooperate for the efficient functioning of the water circulating system under all conditions.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawings, wherein:—

Figure 1 is a plan view of an automobile engine and its water circulating system, showing the improved device applied.

Figure 2 is a side elevation thereof.

Fig. 3 is a vertical section on the line 3—3 of Fig. 2.

Fig. 4 is a detail view showing a modification.

The device is shown in the drawings as applied to the engine and water circulating system of a Ford automobile, which, as well known, uses no pump for circulating the water, but depends upon the thermal-siphon circulation of the water. Such circulation of the water is naturally slow or sluggish, especially at times. The engine 6 has the exhaust manifold 7, water jacket 8, cylinder head 9, and a hot water connection 10 leading upwardly from the water jacket and cylinder head to the upper portion of the water-cooling radiator 11. This radiator has a filling neck 12 at the top thereof, constituting the highest point of the water circulating system, and a cap 13 is removably secured on said neck to permit the water circulating system to be filled with water at intervals by the removal of such cap. From the lower portion of the radiator, a return hose or conduit 14 leads to an elbow or inlet connection 15 secured to the water jacket 8 for the entrance of the cool water from the radiator. The hot water will rise from the water jacket 8 through the connection 10 into the radiator, and in being cooled in the radiator, by the flow of air therethrough, as well known, the cool water settles to the bottom of the radiator and passes through the hose 14 and back into the water jacket by thermal-siphonic action.

In order to stimulate the circulation of the water, a tube 16 is attached at one end to the exhaust manifold 7, and its opposite terminal is secured through the wall of the elbow or inlet connection 15 of the water jacket and such terminal 17 is bent to project in a direction in which the water enters the jacket 8, whereby the stream of exhaust gas which passes through the tube is directed into the water jacket to serve as an injector. A controlling valve 18 is interposed in the tube 16 and is carried by a dash 19 of the automobile, said valve having a handle 20 which can be conveniently operated for opening and closing the valve 18 whereby to establish or shut off the flow of gas, as the operator may desire. The tube 16 is also provided with any suitable check valve 21, to prevent the reverse flow in said tube and to prevent the water from backing up into the tube 16.

The exhaust gas which enters the water jacket 8 will naturally rise through the water jacket and connection 10 to the upper portion of the radiator 11, and pass out through the vent aperture in cap 13.

The means for receiving and holding the overflow water, vapor and steam from the radiator 7 comprises an elongated horizontal tank 22 disposed longitudinally at one side of the water jacket 8 between the uppermost and lowermost portions of the water circulating system, and said tank is preferably cylindrical. Metal straps 23 embrace the tank 22 and have their terminals engaging the adjacent bolts 24 which clamp the cylinder head 9 down. The overflow tube 25 which leads downwardly from within the neck 12 of the radiator is connected at its lower end with the forward end of the tank 22, centrally of said forward end, and a tube 26 is connected to the rear end of the tank centrally of such rear end, and extends upwardly above the tank and then downwardly through the top of the elbow or inlet connection 15 behind the tube 16, as seen in Fig. 3.

During the operation of the engine, therefore, the valve 18 can be opened, whereby a part of the exhaust gas will flow through the tube 16, to be discharged from the terminal nozzle 17 out of the delivery end of the return conduit 14 into the water jacket, thereby forcing the circulation of water into and through the water jacket. The water which overflows from the radiator down the tube 25 will pass into the tank 22, and the vapor and steam will also flow down said tube into said tank to be condensed. In this way, the overflow water and steam are caught and retained in said tank. When the radiator 11 is filled with water, the water will also flow down the tube 25 and fill the tank 22 about one-half full up to the level of the ends of the tubes 25 and 26 where they are attached to the tank, as seen in Fig. 3. Then, as more water overflows down the tube 25, during the running of the engine, and when steam or vapor passes down said tube and condenses, the tank 22 will be filled further with water, and the water will also rise within the tubes 25 and 26. The tube 26 is a siphon, whereby when the water in the radiator 11 becomes low and the water in the tube 25 and 26 rises to a level to the crown of the tube 26, the water will flow from the tank 22 through the tube 26 by siphonic action, assisted by the suction created at the delivery end of the tube 26, within the elbow 15, by the discharge of exhaust gas from the terminal or nozzle 17, thereby returning the water to the circulating system and filling up the radiator. When the automobile is travelling on a level road, the tank 22 cannot fill up much above the inlet and outlet thereof, in view of the air remaining in the upper portion of the tank. However, in view of the position of the tank and the connection of the tubes 25 and 26 with the opposite ends thereof as shown, the trapped air can escape up through the tube 25, when the forward end of the machine is higher than the rear end, as when going up a hill. In this case, the water will fall back to the rear end of the tank 22, and the air in escaping, will permit any water in the tube 25 to pass down into the tank. Such action, especially if repeated, will permit the tank 22 to fill almost completely up to the top. Then, when the water is discharged from the tank 22 back into the water circulating system, there will be sufficient in the tank to again fill the water circulating system full, especially if this action takes place while going up a hill when the water falls back to the rear end of the tank 22, which will start the siphon, and almost empty the tank 22.

In Fig. 4 the exhaust gas tube 16′ and water tube 26′ are connected by a Y-coupling 28 with a common delivery tube 29 extending into the elbow or inlet connection 15 and having the terminal or nozzle 17′ for directing the gas and water into the water jacket of the engine. This arrangement will facilitate the flow of the water through the tube 26′ when the tank 22 becomes filled.

When the water level in the radiator 11 lowers, by the overflow of water into the tank 22, or the boiling of the water so that the steam passes down through the tube 25 and condenses in the tank 22, the action of the exhaust gas discharging from the terminal or nozzle 17 or 17′ will create a more violent flow of the water, thereby creating greater suction in the tube 26, to start the flow of water from the tank 22, so as to again fill up the radiator 11. As a result, the water circulating system is kept sufficiently full of water to insure proper cooling of the engine, and the circulation is maintained by the exhaust gas.

Having thus described the invention, what is claimed as new is:—

1. The combination with an internal combustion engine and its water circulating system, of a water tank located between the uppermost and lowermost portions of said system, an overflow tube leading downwardly from the upper portion of the water circulating system and connected to said tank, a water delivery tube connected to the tank and leading upwardly above said tank and then downwardly to form a siphon and having its lower end connected to said system at a point below the tank, and means for the discharge of gas under pressure at the lower end of said delivery tube to assist siphonic action in the flow of water through said delivery tube.

2. The combination with an internal combustion engine and its water circulating system, of an elongated water tank disposed in a longitudinal position at one side of the engine between the uppermost and lowermost portions of said water circulating system, an overflow tube leading downwardly from the upper portion of said system and connected to the forward end of said tank between the top and bottom thereof, a water delivery tube connected to the rear end of the tank substantially midway between the top and bottom thereof, the water delivery tube extending upwardly to a point above the horizontal plane of the tank and then downwardly to form a siphon and having its lower end connected to said system at a lower level than the tank, and means for the discharge of gas under pressure at the lower end of said water delivery tube to assist siphonic action in the flow of water through said delivery tube.

In testimony whereof I hereunto affix my signature.

RAY TAYLOR.